United States Patent [19]
Athanasoulas

[11] 3,810,410
[45] May 14, 1974

[54] SAW BLADE
[76] Inventor: Evangelos G. Athanasoulas, 20 Alexandrou Zarra St., Arta, Greece
[22] Filed: May 8, 1972
[21] Appl. No.: 251,033

Related U.S. Application Data
[62] Division of Ser. No. 880,343, Nov. 26, 1969, Pat. No. 3,661,037.

[30] Foreign Application Priority Data
Nov. 28, 1968 Greece .................................. 36114

[52] U.S. Cl. ......................... 83/852, 83/854, 83/661
[51] Int. Cl. ...................... B27b 33/06, B23d 61/12
[58] Field of Search ........ 143/133 R, 133 A, 140 C, 143/140 R, 143; 83/852, 854, 835, 846, 847, 848, 853, 661

[56] References Cited
UNITED STATES PATENTS
236,876    1/1881    Douglas .............................. 83/852
558,466    4/1896    Bowles ............................ 143/140 C
2,270,776  1/1942    Thornton ........................ 143/140 B
2,224,867  12/1940   Hechler ........................... 143/133 R

*Primary Examiner*—Donald R. Schran
*Attorney, Agent, or Firm*—Dennison, Dennison, Townshend & Meserole

[57] ABSTRACT

The teeth of a saw blade and particularly of a band saw blade are transversely set so that, for each such set tooth a portion of the tooth bounded by its leading edge and by an outwardly extending line of set is disposed transversely to the remainder of the tooth. The line of set extends edgewise outwardly from the leading edge of the tooth and preferably intersects the trailing edge of the tooth along a line generally parallel to the leading edge.

6 Claims, 10 Drawing Figures

PATENTED MAY 14 1974 3,810,410

SAW BLADE

CROSS REFERENCE TO RELATED APPLICATION

This application is a division of application Ser. No. 880,343, filed Nov. 26, 1969 and entitled SAW BLADES AND MACHINES FOR SERVICING THEM, now U.S. Pat. No. 3,661,037.

BACKGROUND OF THE INVENTION

The present invention relates to novel saw blades.

One important object of the present invention is to provide a saw blade, the teeth of which are set in a novel manner to provide highly effective performance during a cutting operation using such a saw blade. More particularly, the invention provides a saw blade which is especially effective in removing saw dust from the kerf of a saw cut and which needs to have its teeth re-set somewhat less frequently than is the case of conventionally set blades.

SUMMARY OF THE INVENTION

In its broadest scope, a novel saw blade according to the invention can be defined as comprising an elongated spine and integrally formed with said elongated spine a plurality of teeth extending edgewise outwardly from said spine, each said tooth comprising a leading edge and a trailing edge and said trailing edge subtending a smaller angle than said leading edge with said spine, and in which at least some of said teeth are set transversely with respect to said elongated spine, each such transversely set tooth being set about a line of set extending outwardly from the leading edge of the tooth to the trailing edge thereof.

Other objects, features and advantages of the invention will become apparent as the description herein proceeds.

BRIEF DESCRIPTION OF THE DRAWINGS

The invention will now be described merely by way of illustration with reference to the accompanying drawings in which.

DESCRIPTION OF THE PREFERRED EMBODIMENT

Figure 1:
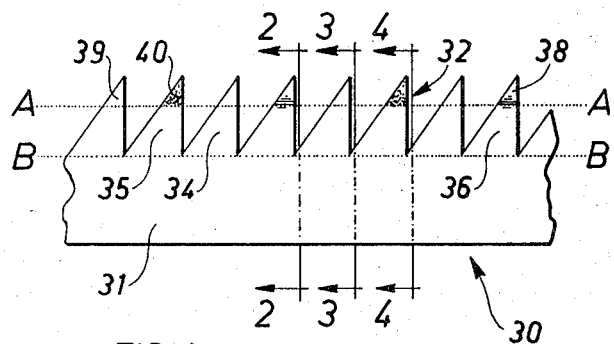
FIG. 1 is a fragmentary front elevation of a band saw blade as already known.

The saw blade generally indicated at 30 in FIGS. 1 to 4 of the accompanying drawings is representative of those already known and will first be briefly considered. The blade 30 comprises a spine 31 and has integrally formed with that spine a plurality of edgewise projecting teeth generally indicated at 32. As is conventional, some of these teeth are deformed or 'set' transversely to the left while others are transversely set to the right. For the particular blade 30 illustrated, alternate teeth 34 are not set and extend directly from the spine 31 in the principal plane of that spine as shown at 39 in FIGS. 1 and 3. The setting of the intervening teeth 35 is shown as being to the left in FIG. 4 while the teeth 36 are shown as being set to the right in FIG. 2, references to the left and right being understood as applying when the blade 30 of FIG. 1 is viewed from the right-hand end of that figure.

Figures 2, 3, 4:
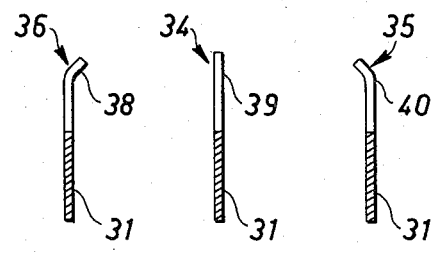
FIG. 2 is a transverse section through the blade of FIG. 1 when taken along the line 2—2 of that figure.
FIG. 3 is a similar section to that of FIG. 2 but taken along the line 3—3 of FIG. 1.
FIG. 4 is a similar section to those of FIGS. 2 and 3 but taken along the line 4—4 of FIG. 1.

It will now be seen that all the teeth which are set are deformed about a line A—A which is parallel to the longitudinal direction of the blade 30 as indicated by the line B—B of FIG. 1. For example, the tip sections 40 of the teeth 35 are deformed about the line A—A to the left (FIG. 4) while the tip sections 38 of the teeth 36 are deformed about the line A—A to the right (FIG. 2). The tip sections 39 of the teeth 34 are non-deformed.

Reference will now be made to FIGS. 5 to 10 of the accompanying drawings in which there is illustrated a particularly useful embodiment of a saw blade in accordance with the present invention. It will be seen that this blade generally indicated at 44 comprises a longitudinally extending spine portion 45 and a plurality of edgewise extending teeth generally indicated at 46. In the particular blade 44 shown in FIGS. 5 to 10, alternate teeth 48 are not set, i.e., they are disposed in the same plane as the spine 45 as will readily be understood by reference to the drawings.

Figure 5:
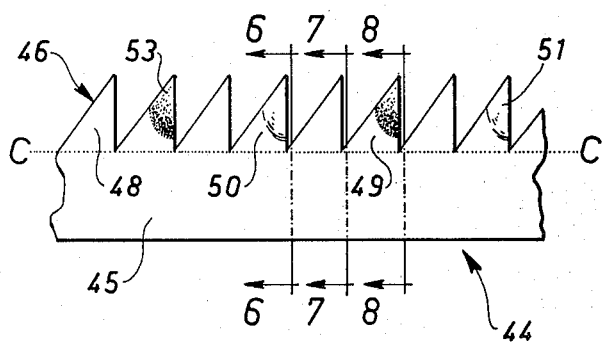
FIG. 5 is a fragmentary front elevation of a useful embodiment of a saw blade in accordance with the present invention.
Figures 6, 7, 8:
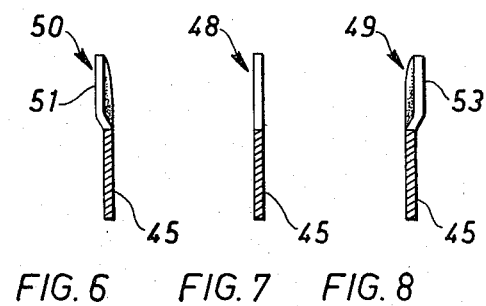
FIG. 6 is a transverse section through the blade of FIG. 5 when taken along the line 6—6 of FIG. 5.
FIG. 7 is a similar section to that of FIG. 6 but taken along the line 7—7 of FIG. 5.
FIG. 8 is a similar section to those of FIGS. 6 and 7 but taken along the line 8—8 of FIG. 5.
Figure 9:
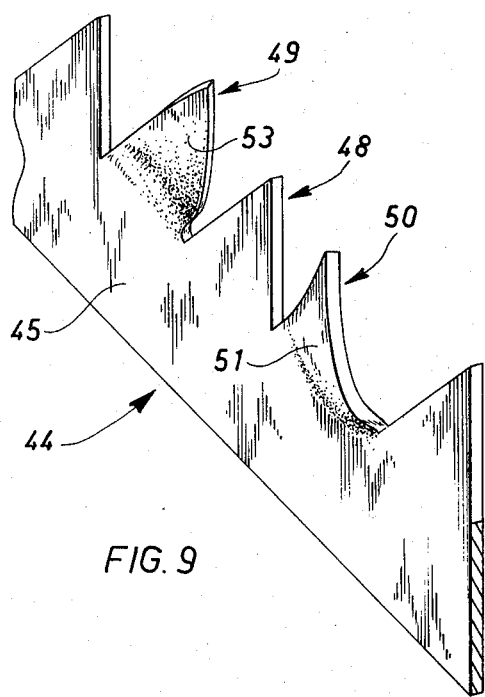
FIG. 9 is an enlarged, fragmentary perspective view of the blade shown in FIG. 5.
Figure 10:
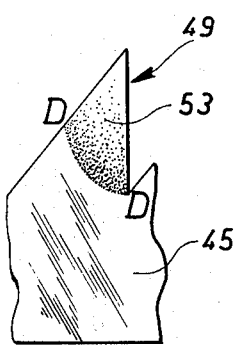
FIG. 10 is a fragmentary front elevation of the blade of FIG. 9 showing in greater detail the manner in which in accordance with the present invention an individual tooth of the saw blade is preferably set.

Between the teeth of alternate pairs of adjacent 'unset' teeth 48, the teeth 50 are deformed or set in one transverse direction as shown in FIGS. 5 and 6 while between other pairs of unset teeth 48, the teeth 49 are transversely set in the opposite transverse direction as shown in FIGS. 5 and 8.

It will also be noted that, in accordance with an important feature of this invention, each of the teeth 49 and 50 is deformed about a line D—D which is disposed angularly with respect to the longitudinal direction of the blade 44 as indicated by the line C—C of FIG. 5. In particular, it will be noted that for the blade 44 shown in FIGS. 5 to 10, the 'line of set' D—D for each of the set teeth 49 and 50 extends from a leading edge of the tooth outwardly to the trailing edge of the same tooth so as to define a leading tooth portion 53 and 51 respectively which has a leading edge surface disposed generally parallel to but offset from the spine 45 of the blade 44. Furthermore, the line D—D (FIG. 10) usefully curves outwardly from the leading edge of a tooth so as to approach a parallel disposition to such leading edge on reaching the trailing edge of the tooth as is particularly shown in FIG. 9.

Saw blades as exemplified by saw blade 44 have been found to be particularly advantageous in use in providing considerably improved removal of saw-dust from the kerf of a saw cut. It should perhaps be pointed out that the saw blades of the present invention are not restricted to ones in which the setting of the teeth is carried out in the particular tooth-to-tooth sequence actually shown in FIGS. 5 to 10. The invention equally embraces saw blades in which all the teeth are set, for example, alternately to each transverse side of the blade.

The teeth of a saw blade in accordance with this invention can be set by hand or by machine. One construction of a machine for such a purpose is described in greater detail in my aforementioned U.S. Pat. application Ser. No. 880,343.

What is claimed is:

1. A saw blade comprising a body defined by mutually parallel and longitudinally extending side faces and integrally formed with said body a plurality of teeth extending edgewise outwardly from said body, each said tooth comprising an essentially continuous and linear leading edge meeting said body and a trailing edge, and in which at least some of said teeth are set transversely with respect to said body, each such transversely set tooth being set about a line of set intersecting said leading edge of the tooth and curving angularly and outwardly from the leading edge of that tooth so as to intersect the trailing edge of that tooth along a line substantially parallel to said leading edge of said tooth to provide (a) a leading edge portion defined by mutually parallel faces disposed in planes parallel to said side faces of said body and (b) a transversely extending web portion including said line of set.

2. A saw blade as claimed in claim 1 in which each said transversely set tooth is transversely set to provide a said leading edge portion having a leading edge formed as an integral extension of the leading edge of an unset portion of said tooth and extending generally parallel thereto.

3. A saw blade as claimed in claim 2 in which said teeth thereof are transversely set to alternate sides of said body.

4. A saw blade as claimed in claim 2 in which alternate teeth thereof are transversely set and in which said transversely set teeth are set to alternate sides of said body.

5. A saw blade as claimed in claim 1 in which said line of set of each said transversely set tooth extends from a point on said leading edge of said tooth, which point is disposed outwardly of said body.

6. A saw blade as claimed in claim 1 and in which said trailing edge of each said tooth subtends a smaller angle with said body than does said leading edge thereof.

* * * * *